United States Patent
Kvieska et al.

(10) Patent No.: US 12,012,164 B2
(45) Date of Patent: Jun. 18, 2024

(54) DEVICE AND METHOD FOR MONITORING THE TRAJECTORY OF A MOTOR VEHICLE

(71) Applicant: RENAULT s.a.s., Boulogne-Billancourt (FR)

(72) Inventors: Pedro Kvieska, Versailles (FR); Simon Mustaki, Paris (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 268 days.

(21) Appl. No.: 17/416,965

(22) PCT Filed: Dec. 12, 2019

(86) PCT No.: PCT/EP2019/084938
§ 371 (c)(1),
(2) Date: Jun. 21, 2021

(87) PCT Pub. No.: WO2020/126840
PCT Pub. Date: Jun. 25, 2020

(65) Prior Publication Data
US 2022/0081028 A1    Mar. 17, 2022

(30) Foreign Application Priority Data
Dec. 21, 2018   (FR) ...................................... 18 73825

(51) Int. Cl.
B62D 6/00       (2006.01)
(52) U.S. Cl.
CPC ...................... B62D 6/00 (2013.01)
(58) Field of Classification Search
CPC ...................................................... B62D 6/00
See application file for complete search history.

(56) References Cited

U.S. PATENT DOCUMENTS

| | | | |
|---|---|---|---|
| 9,731,755 B1* | 8/2017 | Moshchuk | B62D 6/00 |
| 2005/0225477 A1* | 10/2005 | Cong | B60K 31/0083 |
| | | | 342/72 |
| 2006/0020382 A1 | 1/2006 | Shin et al. | |

(Continued)

FOREIGN PATENT DOCUMENTS

DE         102 54 392 A1    5/2004

OTHER PUBLICATIONS

International Search Report dated Mar. 18, 2020 in PCT/EP2019/084938 filed on Dec. 12, 2019, 2 pages.

(Continued)

*Primary Examiner* — Jaime Figueroa
*Assistant Examiner* — Zachary Joseph Wallace
(74) *Attorney, Agent, or Firm* — Oblon, McClelland, Maier & Neustadt, L.L.P.

(57) ABSTRACT

A method for setting an anticipator module with which a control device controls the trajectory of a motor vehicle is equipped includes detecting whether the anticipator module is unsuitable during a turn by taking account of a lateral deviation with respect to an ideal trajectory and/or a contribution of a feedback module of the control device, determining primary parameters, calculating a secondary parameter by an optimization-based calculation method taking account of the determined primary parameters, and updating a bicycle model of the vehicle by taking account of the calculated secondary parameter.

12 Claims, 8 Drawing Sheets

(56) References Cited

U.S. PATENT DOCUMENTS

2007/0213901 A1    9/2007  Shin et al.
2016/0107682 A1*  4/2016  Tan .......................... B62D 6/00
                                                                                  701/41
2016/0244068 A1*  8/2016  Thor .................. B60T 8/17551

OTHER PUBLICATIONS

Preliminary French Search Report dated Oct. 31, 2019 in French Patent Application No. 18 73825 filed on Dec. 21, 2018 (with translation of categories of cited documents), 3 pages.

* cited by examiner

DEVICE AND METHOD FOR MONITORING THE TRAJECTORY OF A MOTOR VEHICLE

BACKGROUND

The present invention relates to the control of the trajectory of a motor vehicle, and more particularly a trajectory control device and method.

Motor vehicles are often equipped with trajectory control devices assisting the driver in keeping the vehicle in a traffic lane. They act on the steering of the vehicle by modifying the lock angle of the drive wheels of the vehicle. A control law is implemented and can be a comfort control law of the type involving keeping to the center of a traffic lane, also known as Lane Centering Assist, known also by the acronym "LCA". The control law can also be a safety control law of the type assisting in keeping in the lane, also known as Lane Keeping Assist, or known by the corresponding acronym "LKA".

In this context, the choice is generally made to implement a smooth control law that avoids jerks. Surprises to the driver are thus avoided and the comfort of the occupants of the vehicle is enhanced.

A trajectory control device comprising a feedback module makes it possible to implement such a control law. The feedback module creates a closed loop and exhibits slow dynamics. To improve the level of service provided, an anticipator module can also be added. The anticipator module adds an open-loop term to the closed-loop term supplied by the feedback module.

Reference can for example be made to the document FR 3 051 756 which illustrates a device for the real-time control of the trajectory of a vehicle. This device comprises a feedback module generating a closed-loop term and an anticipator module generating an open-loop term. The closed loop keeps the vehicle at the center of a virtual lane which is considered to be always straight. The open loop takes account of the curvature and neutralizes the effect of the turn on the states and the control.

Although such a device provides overall satisfaction, never, in particular, compromising the safety of the passengers, some situations of use of the vehicle can bring about disagreeable situations for the driver, such as the occurrence of oversteering or an abnormal deviation of the vehicle. For example, in the case of overloading of the motor vehicle, an abnormal deviation of the vehicle with respect to the center of the lane is sometimes observed.

To mitigate this drawback, the closed loop can be made more dynamic for the oversteering or the deviation to be corrected by the closed loop. The good safety of the occupants of the vehicle is thereby assured. However, the more dynamic closed loop is less comfortable for the driver and the occupants of the vehicle.

BRIEF SUMMARY

In light of the above, the aim of the invention is to remedy the abovementioned drawbacks.

More particularly, the invention aims to enhance the comfort in the vehicle upon the implementation of trajectory control in order to stay within a traffic lane, notably upon the occurrence of a turn.

To this end, a method is proposed for setting an anticipator module with which a device for controlling the trajectory of a motor vehicle is equipped, wherein:

a detection is made whether the anticipator module is unsuitable upon a turn by taking account of a lateral deviation with respect to an ideal trajectory and/or a contribution of a feedback module of the control device, primary parameters are determined, a secondary parameter is calculated by an optimization-based calculation method taking account of the determined primary parameters, and a bicycle model of the vehicle is updated by taking account of the calculated secondary parameter.

Such a method makes it possible to correct the setting of the anticipator module. The result thereof is a correction of the trajectory deviation that is more assured by the anticipator module and therefore the possibility of reducing the contribution of the feedback module, providing better comfort in the motor vehicle. In particular, the abnormal deviation with respect to the center of the lane described previously stems notably from the impact of the load on the dynamics of the vehicle. The method according to the invention makes it possible to take account of this impact.

Preferably, it is detected that the anticipator module is unsuitable if:

the lateral deviation with respect to an ideal trajectory is greater than a predefined deviation threshold, and a ratio of a contribution of the feedback module to a contribution of the anticipator module for the steering control is greater than a predefined ratio threshold.

This detection allows for a better identification of conditions requiring the correction of the setting of the anticipator module.

Preferably, when a bicycle model of the vehicle is updated, a characteristic datum of the corrected bicycle model is determined by taking account of the secondary parameter, an average is calculated between a characteristic datum of the current bicycle model and the characteristic datum of the corrected bicycle model and the characteristic datum of the current bicycle model is replaced by the calculated average.

Such an updating step makes it possible to increase the robustness of the setting method.

Different variants can be envisaged regarding the secondary parameter.

According to a first variant, the calculation of a secondary parameter comprises the calculation of a corrected understeering gradient, the corrected understeering gradient preferably being a characteristic datum of the bicycle model of the vehicle.

Such a variant is preferable inasmuch as it requires less in the way of memory and computation resources.

Preferably, the primary parameters comprise a traffic lane curvature, a speed of the vehicle and a steering wheel angle, the corrected understeering gradient being calculated by the minimization of a steering wheel angle deviation, and advantageously by the minimization of the function:

$$f = \sum_i (\rho(i) \times (L_{tot} + \nabla_{sv} \times v(i)^2) \times d - SWA_{measured}(i))^2 \quad \text{[Math 1]}$$

in which, $L_{tot}$ is the wheelbase of the vehicle, d is the gear reduction ratio of the steering column of the vehicle, $\nabla_{sv}$ is the understeering gradient and, regardless of an iteration i, $\rho(i)$ is the traffic lane curvature upon the iteration i, v(i) is the speed of the vehicle upon the iteration i and $SWA_{measured}(i)$ is the steering wheel angle during the iteration i.

According to a second variant, the calculation of the secondary parameter comprises the calculation of a corrected front train stiffness and/or of a corrected rear train stiffness.

The method can, optionally, comprise the identification of other parameters of the bicycle model such as the weight, the inertia, the position of the center of mass.

Preferably, the primary parameters comprise a lateral deviation with respect to an ideal trajectory, a longitudinal speed of the vehicle, a heading angle of the vehicle, a steering wheel angle and a traffic lane curvature and in which a reference trajectory is constructed from the primary parameters, the optimization being implemented by the minimization of the deviation between the reference trajectory and a trajectory of the vehicle determined from characteristic data of the current bicycle model of the vehicle.

Advantageously, the reference trajectory is constructed on the basis of the primary parameters by applying the relationship:

$$\begin{cases} X_{ref}(t_k) = X_{road}(t_k) - y_L(t_k) \cdot \sin(\psi_{rel} + \psi_{road}(t_k)) \cdot (t_k - t_{k-1}) \\ Y_{ref}(t_k) = Y_{road}(t_k) + y_L(t_k) \cdot \cos(\psi_{rel} + \psi_{road}(t_k)) \cdot (t_k - t_{k-1}) \end{cases}$$ [Math 2]

in which $t_k$ is the relative instant on an iteration k, $(X_{ref}(t_k), Y_{ref}(t_k))$ is the pair of coordinates of the reference trajectory at the instant tk, $(X_{road}(t_k), Y_{road}(t_k))$ is the pair of coordinates of the traffic lane center trajectory at the instant $t_k$, $y_L(t_k)$ is the lateral offset between the center of gravity of the vehicle and the traffic lane center, $\psi_{rel}$ is the relative yaw angle of the vehicle, $\psi_{road}(t_k)$ is the angle tangential to the traffic lane center trajectory at the instant $t_k$, the pair of coordinates of the traffic lane center trajectory and the angle tangential to the traffic lane center trajectory being determined by applying the initialization relationship:

$$\psi_{road}(0) = X_{road}(0) = Y_{road}(0) = 0$$ [Math 3]

and the recurrence relationship:

$$\begin{cases} X_{road}(t_k) = v \cdot \cos(\psi_{road}(t_k)) \cdot (t_k - t_{k-1}) + X_{road}(t_{k-1}) \\ Y_{road}(t_k) = v \cdot \sin(\psi_{road}(t_k)) \cdot (t_k - t_{k-1}) + Y_{road}(t_{k-1}) \\ \psi_{road}(t_k) = \rho \cdot v \cdot (t_k - t_{k-1}) + \psi_{road}(t_{k-1}) \end{cases}$$ [Math 3]

In another embodiment, the bicycle model of the vehicle is reset on each period of absence of use of the vehicle.

Such a reset is more particularly advantageous inasmuch as it avoids having an unsuitable anticipator module if the conditions of use of the vehicle have been modified during the period of absence of use of the vehicle.

According to another aspect, a computer program is proposed comprising a code configured to, when it is executed by a processor or an electronic control unit, implement the method as defined previously.

According to yet another aspect, a device is proposed for setting an anticipator module with which a device for controlling the trajectory of a motor vehicle is equipped, comprising a detection module configured to detect whether the anticipator module is unsuitable upon a turn by taking account of a lateral deviation with respect to an ideal trajectory and/or a contribution of a feedback module of the control device, a module for determining primary parameters, a computation module capable of calculating a secondary parameter by an optimization-based calculation method taking account of the primary parameters determined by the determination module and an updating module configured to update a bicycle model of the vehicle by taking account of the secondary parameter calculated by the computation module.

BRIEF DESCRIPTION OF THE DRAWINGS

Other aims, features and advantages of the invention will become apparent on reading the following description, given purely as a nonlimiting example, and given with reference to the attached drawings in which.

DETAILED DESCRIPTION

Figure 1:
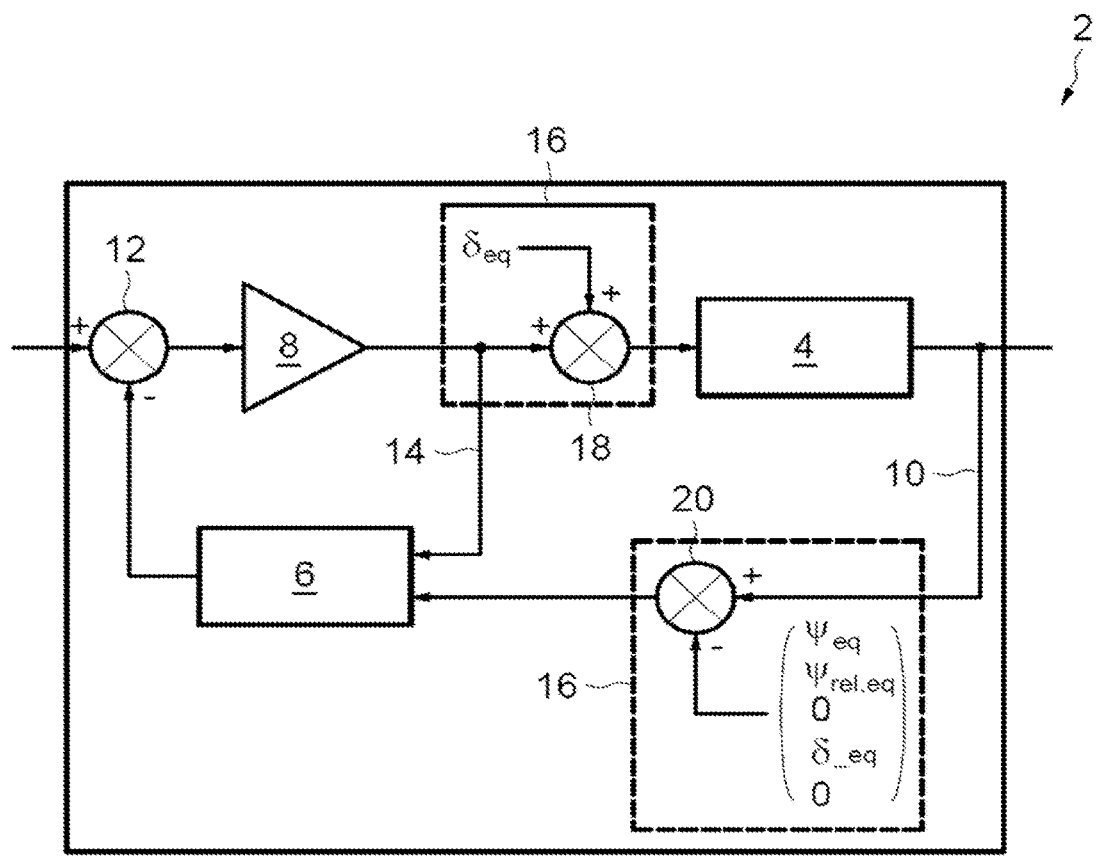
FIG. 1 is a schematic representation of a device for controlling the trajectory of a motor vehicle.

FIG. 1 shows, in block diagram form, a trajectory control device 2 intended to be incorporated in a motor vehicle (not represented). The device 2 is an advanced driving assistance system, also known as "advanced driver assistance system" or known by the corresponding acronym "ADAS". More particularly, the function of the device 2 is to generate a control of a steering system of the motor vehicle so as to keep the vehicle at the center of a virtual lane.

To this end, the block diagram of FIG. 1 comprises a first block 4 corresponding to the vehicle in which the device 2 is incorporated. The block 4 is subject to an input that is a steering wheel angle request. The block 4 delivers an output that is the available measurements, in this particular case the yaw speed, the relative yaw angle with respect to the road, the lateral deviation and the steering wheel angle. The block diagram comprises a second block 6 corresponding to an observer, a sensor or an estimator. The block diagram comprises a third block 8 corresponding to a corrector, for example consisting of a gain vector.

The device 2 comprises a first return loop 10 connected downstream of the block 4, comprising the observer 6 and supplied to a subtractor 12. The device 2 comprises a second return loop 14 extending from a point of connection between the blocks 8 and 4 to the block 6. The set composed of the loops 10 and 14, the block 6 and the subtractor 12, in the present application, is designated "feedback module".

The observer of the block 6 implements a state representation based on the bicycle model. In the present application, the expression "bicycle model" denotes the bicycle model of the vehicle used by the device 2. The bicycle model is notably used by software means in the context of calculation of an anticipation term. The bicycle model is based on a state vector x, the components of which are the following seven states:

$\dot{\psi}$: relative heading angle speed of the vehicle with respect to the roadway, $\psi_{rel}$: relative heading angle of the vehicle with respect to the roadway, $\dot{y}_L$: lateral speed of the vehicle with respect to the roadway, $y_L$: lateral deviation of the vehicle with respect to the roadway, $\dot{\delta}$: speed of the front wheel angle, $\delta$: lock angle, in this case front wheel angle, $\int y_L$: integral of the lateral deviation.

The device 2 further comprises an anticipator module 16. The anticipator module 16 is schematically represented in the block diagram of FIG. 1 by two dotted line rectangles. The module 16 is also known as "feedforward module".

The anticipator module 16 comprises a summer 18 situated between the point of connection of the loop 14 and the block 4. The summer 18 adds an open-loop term $\delta_{eq}$.

The anticipator module 16 comprises a subtractor 20 placed between the point of connection of the loop 10 and the block 6. The subtractor 20 subtracts an open-loop vector from the loop 10.

Figure 2:
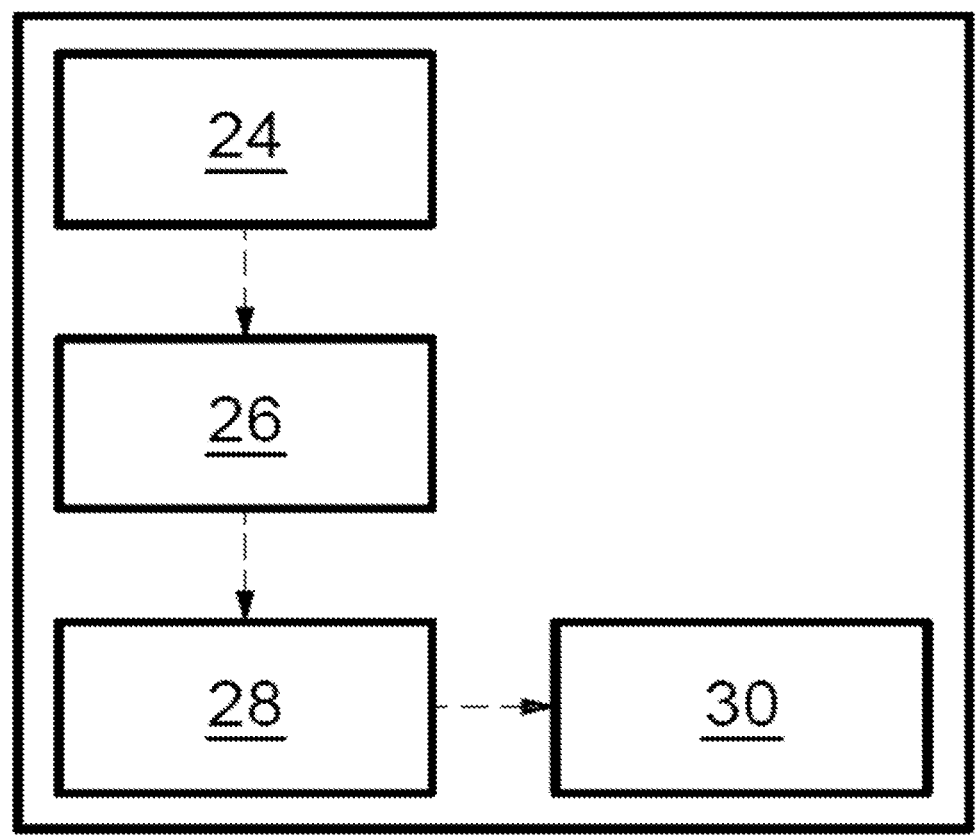
FIG. 2 is a schematic representation of a setting device of the device represented in FIG. 1.

The state representation is represented by the equation below:

In order to improve the performance of the module 16, the device 2 comprises a setting device 22 represented in FIG. 2.

With reference to FIG. 2, the device 22 comprises a detection module 24. The module 24 has an information link with the block 6 of the device 2 so as to quantify the lateral deviation of the vehicle with respect to an ideal trajectory. In the example illustrated, the ideal trajectory is a central line of a traffic lane in which the vehicle is traveling. The module 24 also has an information link with the feedback module and the anticipator module 16 of the device 2. That being so, the module 24 is capable of comparing a contribution of the feedback module for the steering control of the vehicle to a contribution of the anticipator module 16 for the steering control of the vehicle. That being so, the module 24 is provided with hardware and software means for detecting whether the module 16 is inappropriate in a turn.

The device 22 comprises a determination module 26. The module 26 has an information link with the module 24. More particularly, the module 26 is configured to be activated if the module 24 has detected that the anticipator module 16 was inappropriate in a turn. The module 26 has an informa-

[Math 5]
$$\frac{d}{dt}\underbrace{\begin{pmatrix} \dot{\psi} \\ \psi_{rel} \\ \dot{y}_L \\ y_L \\ \dot{\delta} \\ \delta \\ \int -y_L \end{pmatrix}}_{X} = \underbrace{\begin{pmatrix} \frac{-(C_f L_f^2 + C_r l_r^2)}{L_z v} & \frac{C_f L_f - C_r L_r}{L_z} & \frac{-(C_f L_f - C_r L_r)}{L_z v} & 0 & 0 & \frac{C_f L_f}{L_z} & 0 \\ 1 & 0 & 0 & 0 & 0 & 0 & 0 \\ \frac{-(C_f L_f - C_r L_r)}{mw} & \frac{C_f + C_r}{m} & \frac{-(C_f + C_r)}{mv} & 0 & 0 & \frac{C_f}{m} & 0 \\ 0 & 0 & 1 & 0 & 0 & 0 & 0 \\ 0 & 0 & 0 & 0 & -2\xi\omega & -\omega^2 & 0 \\ 0 & 0 & 0 & 0 & 1 & 0 & 0 \\ 0 & 0 & 0 & -1 & 0 & 0 & 0 \end{pmatrix}}_{A} \underbrace{\begin{pmatrix} \dot{\psi} \\ \psi_{rel} \\ \dot{y}_L \\ y_L \\ \dot{\delta} \\ \delta \\ \int -y_L \end{pmatrix}}_{X} + \underbrace{\begin{pmatrix} 0 \\ 0 \\ 0 \\ 0 \\ \omega^2 \\ 0 \\ 0 \end{pmatrix}}_{B_s} \delta_{wheels} + \underbrace{\begin{pmatrix} 0 \\ -v \\ -v^2 \\ 0 \\ 0 \\ 0 \\ 0 \end{pmatrix}}_{B_r} \rho$$

[Math 6]
$$\underbrace{\begin{pmatrix} \dot{\psi} \\ \psi_{rel} \\ y_L \\ \delta \\ \int -y_L \end{pmatrix}}_{X} = \underbrace{\begin{pmatrix} 1 & 0 & 0 & 0 & 0 & 0 & 0 \\ 0 & 1 & 0 & 0 & 0 & 0 & 0 \\ 0 & 0 & 0 & 1 & 0 & 0 & 0 \\ 0 & 0 & 0 & 0 & 0 & 1 & 0 \\ 0 & 0 & 0 & 0 & 0 & 0 & 1 \end{pmatrix}}_{C} \begin{pmatrix} \dot{\psi} \\ \psi_{rel} \\ \dot{y}_L \\ y_L \\ \dot{\delta} \\ \delta \\ \int -y_L \end{pmatrix}$$

in which $C_f$ is the equivalent stiffness of the front axle, $C_r$ is the equivalent stiffness of the rear axle, $L_f$ is the distance between the front axle and the center of gravity, $L_r$ is the distance between the center of gravity and the rear axle, m is the weight of the vehicle, $I_z$ is the moment of inertia of the vehicle and v is the longitudinal speed of the vehicle.

This bicycle model is a simplification of reality. However, the characteristic data of the bicycle model used by the device 2 are directly linked to the configuration of the vehicle, and in particular to configuration parameters such as the distribution of the weight on the vehicle, the pressure of the tires, etc.

The closed-loop lateral control aims to minimize the state vector x around zero, corresponding to a straight line. When a turn appears, three states have to be corrected: the relative heading angle $\psi_{rel}$, the relative heading angle drift $\dot{\psi}$ and the lock angle on the front wheels $\delta$. The angle $\delta$ is linked to the steering wheel angle by a second-order dynamic whose gain corresponds to the gear reduction ratio of the steering column.

tion link with the block 6 and/or with sensors and/or with estimators with which the motor vehicle is equipped so as to detect a plurality of primary parameters.

The device 22 comprises a computation module 28. The module 28 has an information link with the module 26. More particularly, the module 28 is configured to calculate one or more of the secondary parameters when the module 26 has determined primary parameters. In this particular case, the module 28 implements an optimization-based calculation method on the basis of the primary parameters determined by the module 26.

The device 22 further comprises an updating module 30. The module 30 has an information link with the module 28 so as to be able to update the bicycle model of the vehicle used by the device 2 by taking account of the secondary parameter or parameters calculated by the module 28.

Figure 3:
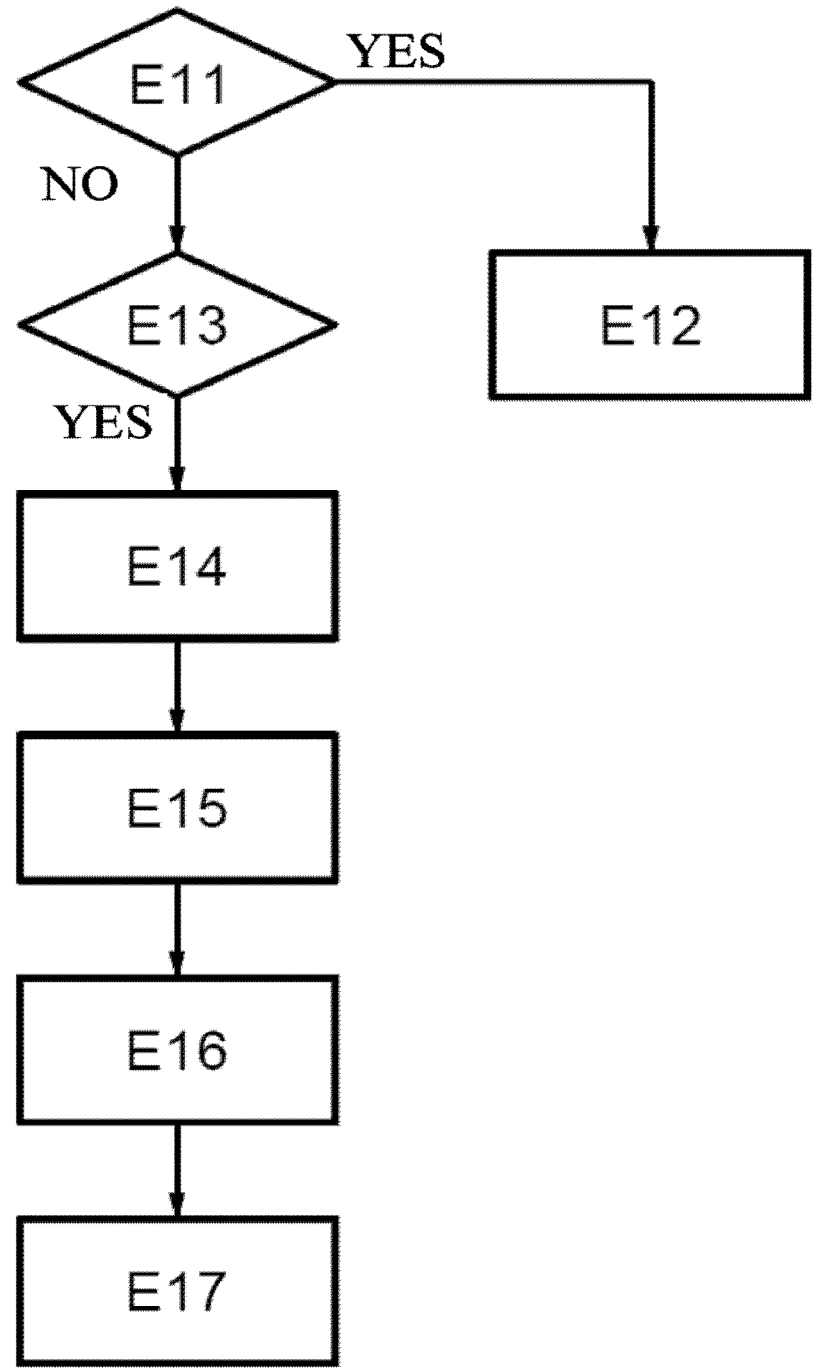
FIG. 3 is a diagram of a method according to a first embodiment of the invention.

With reference to FIG. 3, a method according to a first embodiment of the invention has been schematically represented. The method is implemented by means of the device 22 represented in FIG. 2. In this embodiment, the calculation of the open-loop term is determined by application of the equation:

$$\delta_{eq} = \rho(L_{tot} + \nabla_{sv} \cdot v^2) \quad \text{[Math 7]}$$

in which ρ is a curvature in the traffic lane, $L_{tot}$ is the wheelbase of the vehicle, v is the speed of the vehicle, in this case the longitudinal speed, $\nabla_{sv}$ and is an understeering gradient determined by:

$$\nabla_{sv} = \frac{-m(C_f L_f - C_r L_r)}{C_f C_r L_{tot}} \quad \text{[Math 8]}$$

The method is implemented regularly, for example every 10 ms. The method comprises a first test step E11. During the step E11, a determination is made as to whether the vehicle has just begun a period of absence of use. For example, it is possible to determine, during the step E11, a stopping of the engine with which the motor vehicle is equipped. If, in the step E11, it is detected that the vehicle enters into a period of absence of use, a step E12 is applied. Otherwise, a test step E13 is implemented. During the step E12, the parameters of the bicycle model are reset to the initialization values.

The step E13 is implemented during a turn. In this step, a detection is made as to whether the module 16 is unsuited to the conditions of use of the vehicle in which the device 2 is incorporated. The step E13 is implemented by the module 24. More specifically, during the step E13, the lateral deviation with respect to an ideal trajectory is monitored and the respective contributions of the feedback module and of the module 16 for steering lock control are monitored.

More specifically, in the example illustrated, it is detected that the module 16 is unsuitable if the absolute value of the maximum lateral deviation exceeds a deviation threshold $s_e$ equal to 0.2 m and if the absolute value of the ratio between the contribution of the feedback module to the contribution of the module 16 at the moment of the maximum lateral deviation is above a ratio threshold $s_r$ equal to 0.1.

Figure 4:
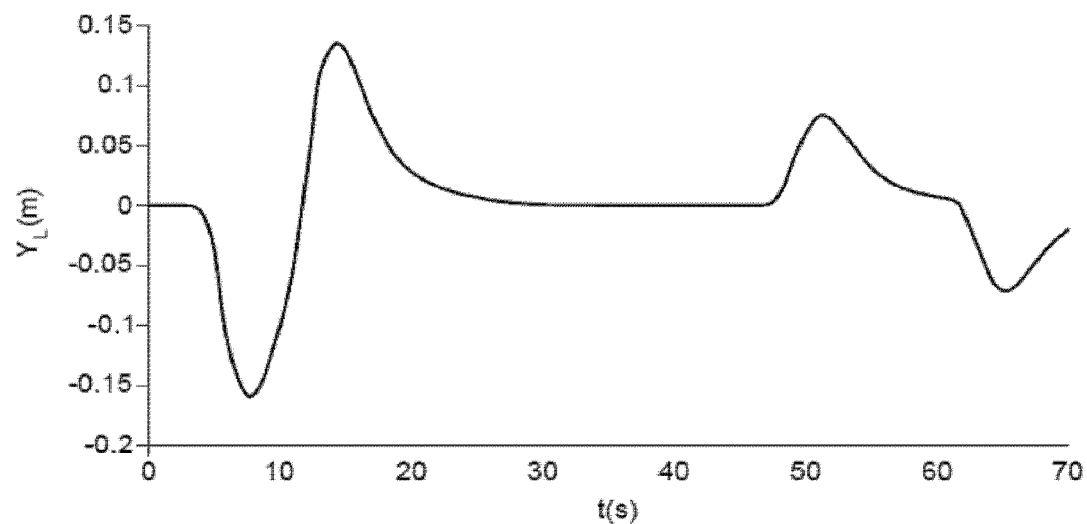
FIG. 4
Figure 4:
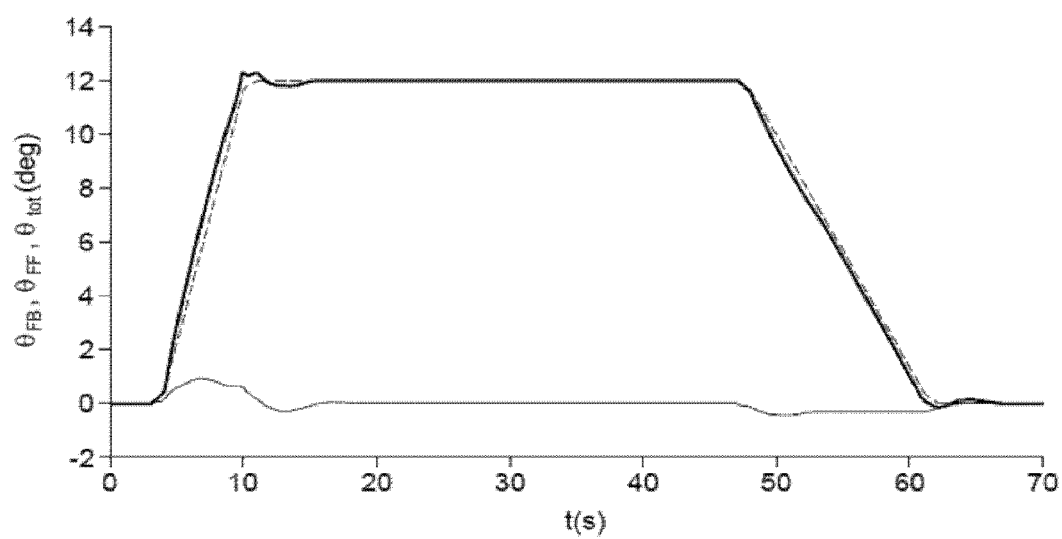

Referring to FIG. 4, this figure schematically represents the lateral deviation ($y_L$) and, in a second graph, the contributions of the feedback module ($\theta_{FB}$) and of the module 16 ($\theta_{FF}$) for a turn simulation at 90 km/h with a curvature of $3 \times 10^{-3}$ m$^{-1}$ when the module 16 is suited to the conditions of use of the vehicle.

Figure 5:
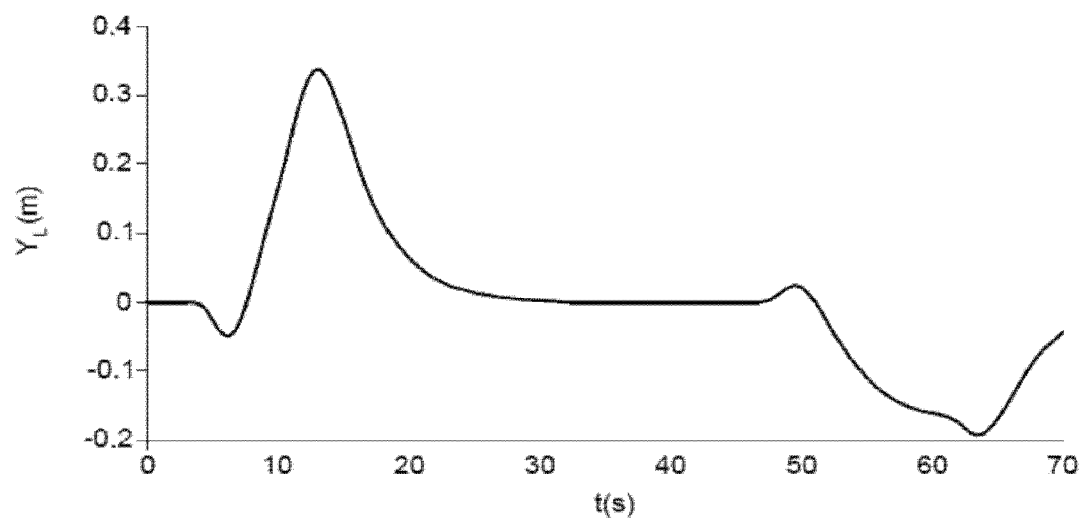
FIG. 5 are graphs representing the lateral deviation and the contribution of an anticipator module and of a feedback module during the method represented in FIG. 3.
Figure 5:
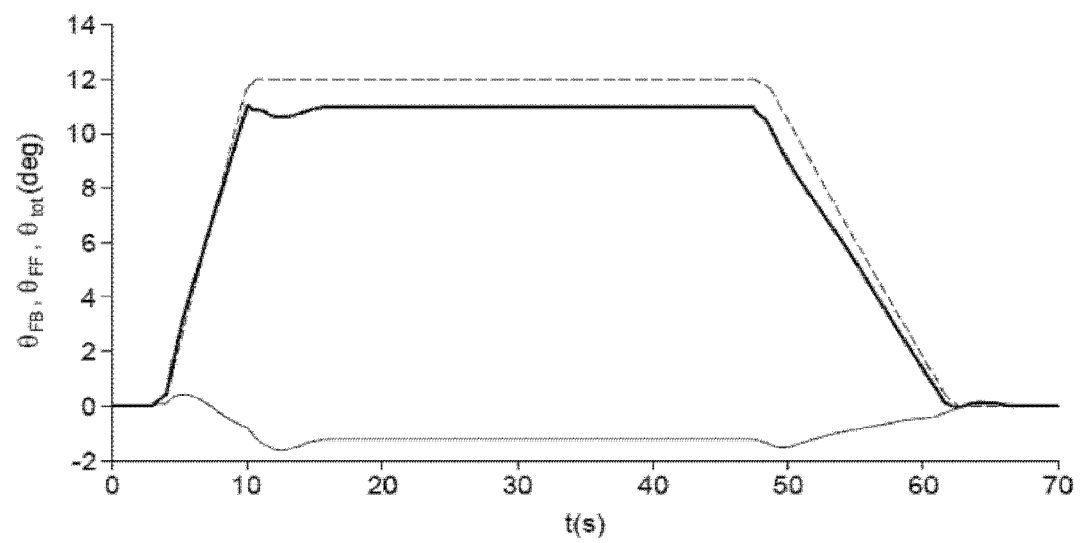

FIG. 5 illustrates the trend, in an identical turn, of the deviation $y_L$ and of the contributions $\theta_{FR}$ and $\theta_{FF}$ with an unsuitable module 16. More particularly, the front and rear train stiffnesses of the vehicle have been increased by 30% without in any way modifying the characteristic data $C_f$ and $C_r$ of the bicycle model used by the module 16. Such a scenario is for example likely to occur when the user of the motor vehicle changes tires. In FIGS. 4 and 5, $\theta_{tot}$ corresponds to the total contribution for the steering lock control, in other words the sum of the contributions $\theta_{FF}$ and $\theta_{FB}$.

It emerges from the graphs of FIG. 4 that the maximum deviation $y_L$ is, in absolute value, of the order of 0.16 m. When the maximum deviation $y_L$ occurs, the contribution $\theta_{FB}$ is less than 1° whereas the contribution $\theta_{FF}$ is 10°. By contrast, it emerges from FIG. 5 that the maximum deviation $y_L$ is of the order of 0.33 m. At this moment, the contribution $\theta_{FB}$ is of the order of −1.8° and the contribution $\theta_{FF}$ is 12°. From these results, and by comparison with the abovementioned thresholds $s_e$ and $s_r$, it appears that the module 16 is unsuitable in the case of FIG. 5.

The module 16 corresponds to an inversion of the module in steady state conditions. If the bicycle module is well identified in a turn, the deviation $y_L$ will be small and the contribution $\theta_{FF}$ will be predominant over the contribution $\theta_{FB}$. Advantageously, the step E13 is triggered only when the lateral acceleration is above an acceleration threshold $s_a$. That being so, the detection of an unsuitable anticipator module is implemented only when the lateral dynamics are sufficiently excited. The result thereof is a more improved relevance of the detection.

Once again with reference to FIG. 3, if, during the step E13, it has been detected that the module 16 was unsuitable, a step E14 is implemented. The step E14 is implemented during a next turn. The step E14 is implemented by the module 26. During the step E14, primary parameters are determined, in this particular case the curvature p of the traffic lane, the longitudinal speed v of the vehicle, a steering wheel angle SWA$_{measured}$ and a time t.

Next, a step E15 of calculation of a secondary parameter is implemented. The step E15 is implemented by the module 28. More particularly, the secondary parameter is calculated by an optimization-based calculation method based on the primary parameters determined during the step E14. This optimization consists in finding the understeering gradient $\nabla_{sv}$ such that the module 16 supplies almost all of the steering lock control and the contribution $\theta_{FR}$ is almost zero in the turn.

Figure 6:
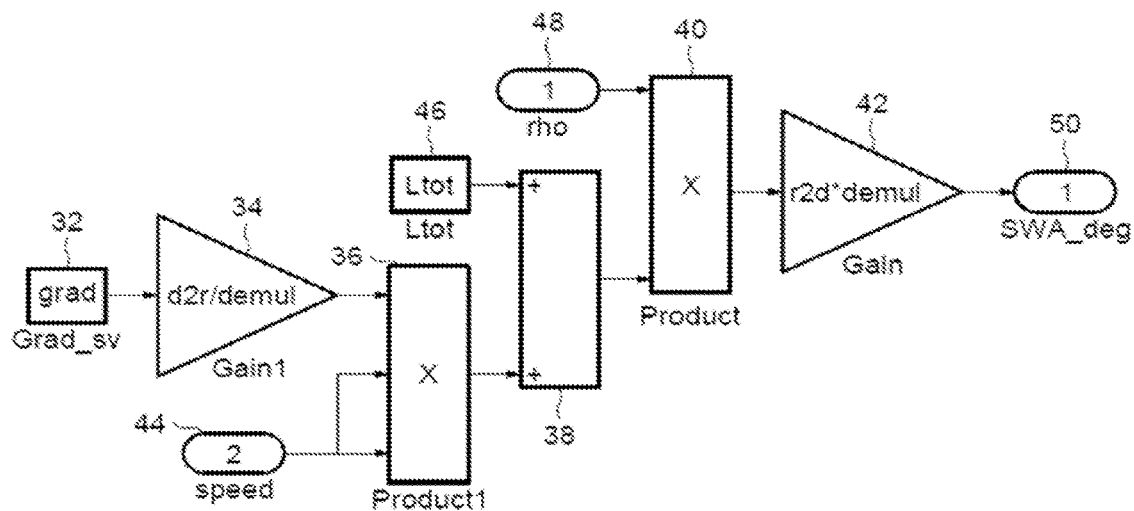
FIG. 6 is a representation of the calculation of the secondary parameter during the method represented in FIG. 3.

FIG. 6 schematically illustrates the calculation of the optimal gradient $\nabla_{sv}$. The diagram of FIG. 6 is obtained from the Simulink software.

The diagram of FIG. 6 comprises a block 32 for inputting the variable to be determined, in this particular case $\nabla_{sv}$ (Grad_sv).

The block 32 is linked to a pure gain block 34. The function of the block 34 is to multiply the variable to be determined to convert degrees into radians and to apply the gear reduction ratio between the lock angle at the front wheels and the steering wheel angle. The result obtained from the block 34 is sent to a multiplier block 36.

A primary parameter input block 44 allows the speed v (speed) of the vehicle to be input. The block 44 is connected to the block 36 so as to multiply the result obtained from the block 34 by the square of the speed of the vehicle.

The result from the block 36 is supplied to a summer block 38. The block 38 is linked with a block 46 for inputting the constant Ltot corresponding to the wheelbase of the vehicle.

The result of the sum calculated by the block 38 is supplied to a multiplier block 40. The block 40 communicates with a block 48 for inputting a primary parameter that makes it possible to input the curvature ρ (rho) of the traffic lane.

The result of the multiplication calculated by the block 40 is supplied to a pure gain block 42. The block 42 multiplies this result to convert radians into degrees. The result obtained in degrees is a steering wheel angle SWA_deg in degrees supplied to the output block 50.

To find the appropriate gradient $\nabla_{sv}$, the inputs are entered, namely the speed v in the block 44 and the curvature ρ in the block 48. The algorithm searches for a gradient $\nabla_{sv}$ such that the output SWA_deg obtained in the block 50 corresponds in the least squares sense to the angle SWA$_{measured}$ on the real steering wheel. The function $f$ defined as:

$$f = \sum_i (\rho(i) \times (L_{tot} + \nabla_{sv} \times v(i)^2) \times d - SWA_{measured}(i))^2 \quad \text{[Math 9]}$$

is thereby sought, as a function of the gradient, to be minimized.

In the example illustrated, the optimization is performed over a series of measurements. During a turn, several iterations are implemented. During an iteration i, the primary parameters ρ(i), v(i) and SWA$_{measured}$(i) are determined. After the last iteration i=n, the function $f$ is minimized in the least squares sense by taking account of the iterations 1 to n. In this equation, L$_{tot}$ is the wheelbase of the vehicle and d is the gear reduction ratio of the steering column of the vehicle. An example of an algorithm that can be implemented to determine the appropriate gradient ∇$_{sv}$ is the Matlab software function "Lsqnonlin". At the end of the step 15, a secondary parameter has been determined, in this particular case an understeering gradient value ∇$_{sv}$.

Following the step E15, a step E16 of updating of the bicycle model is implemented. During the step E16, an average is calculated between the current gradient ∇$_{sv\_current}$ and the corrected gradient ∇$_{sv\_corrected}$ calculated during the step E15. The result is an understeering gradient average ∇$_{sv\_average}$:

$$\nabla_{sv\_average} = \frac{\nabla_{sv\_current} + \nabla_{sv\_corrected}}{2} \quad [\text{Math 10}]$$

Although, in the example illustrated, an average is calculated between the current and corrected gradients, it is of course possible, without departing from the scope of the invention, to envisage another type of calculation, for example a weight arithmetic average:

$$\nabla_{sv\_average} = 0.2 \times \nabla_{sv\_current} + 0.8 \times \nabla_{sv\_corrected} \quad [\text{Math 11}]$$

In the example illustrated, the gradient ∇$_{sv}$ is a characteristic datum of the bicycle model. Thus, during the step E16, a characteristic datum of the corrected bicycle model has been determined. However, there is of course no departure from the scope of the invention in envisaging a bicycle model having other characteristic data. According to an alternative example, the gradient ∇$_{sv}$ determined during the step E15 can be used to determine a pair of drift stiffnesses (C$_f$, C$_r$) of the vehicle using the equation:

$$\nabla_{sv} = \frac{-m(C_f L_f - C_r L_r)}{C_f C_r L_{tot}} \quad [\text{Math 12}]$$

The method next comprises a step E17 during which the gradient ∇$_{sv\_current}$ is replaced by the average ∇$_{sv\_average}$. The steps E16 and E17 are implemented by the module 30. That way, the bicycle model converges toward a model that is as close as possible to reality and the contribution θ$_{FF}$ of the module 16, which becomes more suited to the real configuration of the vehicle, is increasingly predominant in a turn. It is then possible to reduce the dynamics of the feedback module so that the comfort is enhanced for the driver and the occupants of the motor vehicle.

Figure 7:
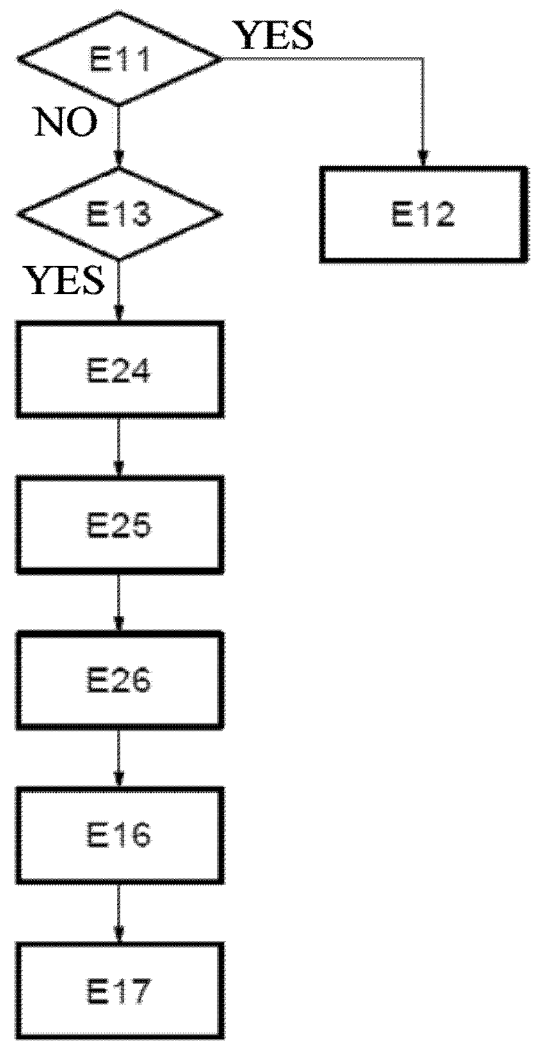
FIG. 7 is a diagram of a method according to a second embodiment of the invention.

With reference to FIG. 7, a method has been represented according to a second embodiment of the invention. The elements that are identical bear the same references. The step E14 is replaced by a step E24, the step E15 is replaced by a step E26 and a step E25 is incorporated between the steps E24 and E26. In this embodiment, the calculation of the open-loop term is determined by application of the equation:

$$\delta_{eq} = \rho \left( L_{tot} - \frac{m(C_f L_f - C_r L_r)}{C_f C_r L_{tot}} \cdot v^2 \right) \quad [\text{Math 13}]$$

During the step E24, the primary parameters determined are the lateral deviation y$_L$ with respect to an ideal trajectory, the speed v, in this case longitudinal, of the vehicle, the relative heading angle ψ$_{rel}$ of the vehicle, the steering wheel angle SWA$_{measured}$ and the curvature ρ of the traffic lane.

During the step E25, a reference trajectory is constructed from the primary parameters determined in the step E24. More particularly, the reference trajectory is determined in a cartesian reference frame (x,y) by accepting that the position and the heading of the vehicle at the start of recording define the origin of the cartesian reference frame (H1) and by calculating the trajectory using a recurrence formula.

Given the hypothesis (H1), then, at t=0:

$$\psi_{road}(0) = X_{road}(0) = Y_{road}(0) = 0 \quad [\text{Math 14}]$$

in which ψ$_{road}$, X$_{road}$ and Y$_{road}$ are respectively the heading angle, the abscissa and the ordinate of a traffic lane center trajectory.

The drift of the heading angle of the traffic lane center trajectory with respect to time is written as follows:

$$\dot{\psi}_{road} = \rho \cdot v \quad [\text{Math 15}]$$

By integrating this expression relative to time, the following is obtained, in discrete form:

$$\psi_{road}(t_k) = \rho \cdot v \cdot (t_k - t_{k-1}) + \psi_{road}(t_{k-1}) \quad [\text{Math 16}]$$

This variable allows the trajectory of the road to be reconstructed in the absolute reference frame:

$$\begin{cases} X_{road}(t_k) = v \cdot \cos(\psi_{road}(t_k)) \cdot (t_k - t_{k-1}) + X_{road}(t_{k-1}) \\ Y_{road}(t_k) = v \cdot \sin(\psi_{road}(t_k)) \cdot (t_k - t_{k-1}) + Y_{road}(t_{k-1}) \end{cases} \quad [\text{Math 17}]$$

That way, the traffic lane center trajectory is estimated. The relationship between the heading angle of the traffic lane center trajectory, the relative yaw angle and the absolute yaw angle is written as follows:

$$\psi_{rel} = \psi_{absolute} - \psi_{road} \Rightarrow \psi_{absolute} = \psi_{rel} + \psi_{road} \quad [\text{Math 18}]$$

From this equation and from the measurements of the lateral deviation y$_L$ and of the measured relative yaw angle ψ$_{rel}$, the trajectory actually followed by the vehicle is constructed around the traffic lane center trajectory in an absolute reference frame:

$$\begin{cases} X_{ref}(t_k) = X_{road}(t_k) - y_L(t_k) \cdot \sin(\psi_{rel} + \psi_{road}(t_k)) \cdot (t_k - t_{k-1}) \\ Y_{ref}(t_k) = Y_{road}(t_k) + y_L(t_k) \cdot \cos(\psi_{rel} + \psi_{road}(t_k)) \cdot (t_k - t_{k-1}) \end{cases} \quad [\text{Math 19}]$$

Figure 8:
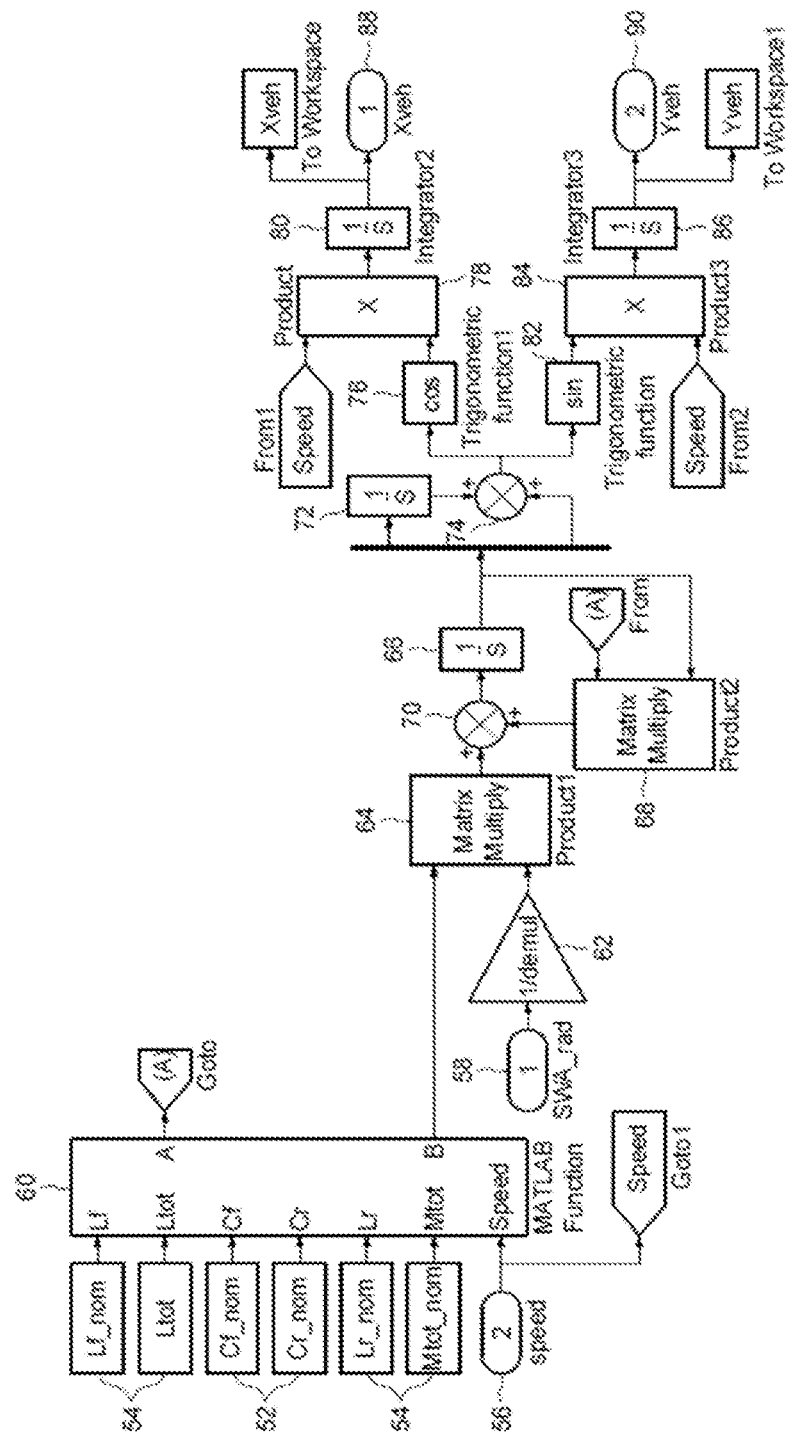
FIG. 8 is a representation of the calculation of the secondary parameters during the method of FIG. 7.

During the step E26, a bicycle model is sought to be found that reproduces the reference trajectory when it is excited with the same longitudinal speed and the same steering wheel angle. This calculation will be explained with reference to the diagram in FIG. 8. The diagram of FIG. 8 presents two blocks 52 for inputting variables to be determined. More particularly, the blocks 52 allow the input of the variables corresponding to the stiffness of drift C$_f$ on the front train and to the stiffness of drift C$_r$ on the rear train. Although, in the example illustrated, the variables to be determined are stiffnesses of drift, it is of course possible, without departing from the scope of the invention, to envisage other variables to be determined, for example the moment of inertia I$_Z$, the distances L$_f$ and L$_r$ or even the weight m.

The diagram of FIG. 8 comprises four constant input blocks 54. In the example illustrated, the constants input correspond to the distance $L_f$, the distance $L_r$, the wheelbase $L_{tot}$ (Ltot) and the weight m (Mtot) of the vehicle.

The diagram of FIG. 8 comprises two primary parameter input blocks 56 and 58. The block 56 allows the speed v (speed) to be input. The block 58 allows the steering wheel angle $SWA_{measured}$ (SWA_rad) to be input in radians.

The diagram of FIG. 8 comprises a matrix generation block 60 allowing the matrix A of the state representation to be generated. The diagram of FIG. 8 comprises a block of multiplication by a pure gain 62 dividing the angle input in the block 58 by the gear reduction ratio to obtain the lock angle on the front wheels.

The diagram of FIG. 8 comprises a matrix multiplier block 64 multiplying the result of the block 62 by the matrix generated by the block 60. An integrator block 66, a matrix multiplier block 68 and a summer 70 are arranged at the output of the block 64.

An integrator block 72 and a summer 74 downstream of the integrator 66 supply a result to a cosine block 76, whose output is multiplied by the speed v by a multiplication block 78 and integrated by an integrator block 80. In parallel, the abovementioned result is submitted to a sine block 82 whose output is multiplied by the speed v by a multiplication block 84 and integrated by an integrator block 86. Two output blocks 88 and 90 collect the signals $X_{veh}$ and $Y_{veh}$ integrated by the blocks 80 and 86, respectively.

The calculation model corresponding to FIG. 8 makes it possible to obtain, from the speed v and from the steering wheel angle SWA, a vehicle trajectory $(X_{veh}, Y_{veh})$ delivered by the blocks 88 and 90. By modifying the variables input in the blocks 52, it is sought to make the output coordinates delivered by the blocks 88 and 90 correspond to the coordinates of the reference trajectory. More particularly, this correspondence is implemented in the least squares sense over the entire selected record. That done, it is sought to minimize the function $f$:

$$f = \sum_i (X_{ref}(i) - X_{veh}(i))^2 + (Y_{ref}(i) - Y_{veh}(i))^2 \qquad \text{[Math 20]}$$

Such a minimization can be done by using, for example, the Matlab function "Lsqnonlin" That done, a corrected pair of stiffnesses $(C_{f\_corrected}, C_{r\_corrected})$ is obtained.

The steps E16 and E17 of the method of FIG. 7 are similar to the steps E16 to E17 of the method of FIG. 3, the two secondary parameters $C_f$ and $C_r$ replacing the secondary parameter $\nabla_{sv}$.

More particularly, during the step E16 of the method of FIG. 7, an average $C_{r\_average}$ and an average $C_{r\_average}$ are calculated:

$$C_{f\_average} = \frac{C_{f\_current} + C_{f\_corrected}}{2} \qquad \text{[Math 21]}$$
$$C_{r\_average} = \frac{C_{r\_current} + C_{r\_corrected}}{2}$$

in which $C_{r\_current}$, $C_{r\_current}$ are, respectively, the current stiffnesses on the front and rear trains, that is to say the stiffnesses before the implementation of the method.

During the step E17 of the method of FIG. 7, the stiffness $C_{f\_current}$ is replaced by the average $C_{f\_average}$ and the stiffness $C_{r\_current}$ is replaced by the average $C_{r\_average}$.

That way, a bicycle model has been established that makes it possible to increase the contribution $\theta_{FF}$ of the module 16 in a turn. It will be noted that the corrected pair of stiffnesses is not necessarily the most representative of the motor vehicle. In fact, it is sufficient to find a combination of values reproducing the behavior of the motor vehicle. In the second embodiment, several pairs $(C_f, C_r)$ culminate in a contribution $\theta_{FB}$ of the feedback module that is almost zero in a stabilized turn. The invention makes it possible to converge toward any one of these pairs and therefore makes it possible, by mobilizing few computation resources, to increase the contribution $\theta_{FF}$ of the anticipator module to the steering lock control and therefore improve the comfort of the occupants of the motor vehicle.

The invention claimed is:

1. A method for controlling a trajectory of a motor vehicle, comprising:
    detecting whether an anticipator module of a control device of the motor vehicle is unsuitable during a turn by taking account of a lateral deviation with respect to an ideal trajectory and/or a contribution of a feedback module of the control device;
    when the anticipator module is unsuitable during the turn, determining primary parameters;
    calculating a secondary parameter by an optimization-based calculation method taking account of the determined primary parameters;
    updating a bicycle model of the vehicle by taking account of the calculated secondary parameter; and
    controlling the trajectory of the motor vehicle via the control device according to output coordinates delivered by the updated bicycle model.

2. The method as claimed in claim 1, wherein the anticipator module is unsuitable when:
    the lateral deviation with respect to an ideal trajectory is greater than a predefined deviation threshold, and
    a ratio of the contribution of the feedback module to a contribution of the anticipator module for steering control is greater than a predefined ratio threshold.

3. The method as claimed in claim 1, wherein, when the bicycle model of the vehicle is updated, a characteristic datum of the bicycle model corrected by taking account of the secondary parameter is determined, an average between a characteristic datum of the current bicycle model and the characteristic datum of the corrected bicycle model is calculated, and the characteristic datum of the current bicycle model is replaced by the calculated average.

4. The method as claimed in claim 1, wherein the calculating the secondary parameter comprises the calculation of a corrected understeering gradient.

5. The method as claimed in claim 4, wherein the corrected understeering gradient is a characteristic datum of the bicycle model of the vehicle.

6. The method as claimed in claim 4, wherein the primary parameters comprise a traffic lane curvature, a speed of the vehicle, and a steering wheel angle, the corrected understeering gradient being calculated by the minimization of a steering wheel angle deviation.

7. The method as claimed in claim 4, wherein the primary parameters comprise a traffic lane curvature ($\rho$), a speed (v) of the vehicle, and a steering wheel angle (SWAmeasured), the corrected understeering gradient ($\nabla sv\_corrected$) being calculated by the minimization of a steering wheel angle deviation, and preferably by the minimization of the function:

$$f = \sum_i (\rho(i) \times (L_{tot} + \nabla_{sv} \times v(i)^2) \times d - SWA_{measured}(i))^2$$

in which Ltot is the wheelbase of the vehicle, d is the gear reduction ratio of the steering column of the vehicle, $\nabla_{sv}$ is the understeering gradient and, regardless of an iteration i, $\rho(i)$ is the traffic lane curvature upon the iteration i, v(i) is the speed of the vehicle upon the iteration i, and SWAmeasured(i) is the steering wheel angle during the iteration i.

8. The method as claimed in claim 1, wherein the calculating the secondary parameter comprises the calculation of a corrected front train stiffness and/or of a corrected rear train stiffness.

9. The method as claimed in claim 8, wherein the primary parameters comprise a lateral deviation with respect to an ideal trajectory, a longitudinal speed of the vehicle, a heading angle of the vehicle, a steering wheel angle, and a traffic lane curvature and wherein a reference trajectory is constructed from the primary parameters, the optimization being implemented by the minimization of the deviation between the reference trajectory and a trajectory of the vehicle determined from characteristic data of the current bicycle model of the vehicle.

10. The method as claimed in claim 1, wherein the bicycle model of the vehicle is reset on each period of absence of use of the vehicle.

11. A non-transitory computer readable medium storing a program that, when it is executed by a processor or an electronic control unit, causes the processor or the electronic control unit to implement the method as claimed in claim 1.

12. A control device that controls a trajectory of a motor vehicle, comprising:
a detection module configured to detect whether an anticipator module of the control device is unsuitable during a turn by taking account of a lateral deviation with respect to an ideal trajectory and/or a contribution of a feedback module of the control device;
a module configured to determine primary parameters when the anticipator module is unsuitable during the turn;
a computation module configured to calculate a secondary parameter by an optimization-based calculation method taking account of the primary parameters determined by the determination module; and
an updating module configured to update a bicycle model of the vehicle by taking account of the secondary parameter calculated by the computation module,
wherein the control device is configured to controlling the trajectory of the motor vehicle according to output coordinates delivered by the updated bicycle model.

* * * * *